United States Patent [19]

Haegeman

[11] Patent Number: 4,468,358

[45] Date of Patent: Aug. 28, 1984

[54] APPARATUS FOR MIXING AIR AND LIQUID

[76] Inventor: Johny H. Haegeman, 122, Steenweg naar Alsemberg, B-1510 Buizingen, Belgium

[21] Appl. No.: 456,452

[22] Filed: Jan. 7, 1983

Related U.S. Application Data

[63] Continuation of Ser. No. 278,232, Jun. 29, 1981, abandoned.

[30] Foreign Application Priority Data

Jul. 8, 1980 [BE] Belgium .......................... 0/884216

[51] Int. Cl.³ ................................................ B01F 3/04
[52] U.S. Cl. .................................... 261/91; 210/219; 239/219; 261/120; 366/279; 415/7; 416/85; 416/188; 416/234; 417/61
[58] Field of Search ........... 261/89, 91, 120, DIG. 79; 366/249, 279; 210/219, 221.1, 242.2; 209/169, 170; 239/219, 221; 415/7; 416/85, 188, 234, 244 B; 417/61

[56] References Cited

U.S. PATENT DOCUMENTS

| 2,346,366 | 4/1944 | Durdin ................................ 210/219 |
| 2,465,671 | 3/1949 | Van Millingen et al. .......... 416/188 |
| 3,416,729 | 12/1968 | Ravitts et al. ..................... 210/242.2 |
| 3,669,422 | 6/1972 | Nogaj .............................. 261/91 X |
| 3,735,926 | 5/1973 | Ravitts ............................. 261/91 X |
| 3,797,809 | 3/1974 | Sydnor, Jr. ........................ 261/91 |
| 3,865,909 | 2/1975 | Cramer, Jr. ....................... 261/91 |
| 3,871,581 | 3/1975 | Dively ............................. 261/91 X |
| 3,911,065 | 10/1975 | Martin et al. ..................... 261/91 |
| 4,093,401 | 6/1978 | Gravelle ......................... 416/188 X |
| 4,193,951 | 3/1980 | Stanley ........................... 261/91 |

FOREIGN PATENT DOCUMENTS 2409549 9/1975 Fed. Rep. of Germany .

OTHER PUBLICATIONS

Peabody Welles, "Floating Aqua-Lator-Direct Drive Aeration", Copyright 1978.

Primary Examiner—Richard L. Chiesa
Attorney, Agent, or Firm—Pollock, Vande Sande & Priddy

[57] ABSTRACT

Apparatus for mixing air with liquid (aerator or oxygenator) comprises a motor or other power drive generally mounted in vertical position on a float or a fixed structure, the motor having a shaft extending downwards through an opening in the center area of the float or fixed structure and bearing on its lower part a propeller located in a cylindrical volute section just underneath the waterlevel. When the apparatus is operating, the waste-water is sucked by means of the propeller from the bottom of the body of liquid on which the apparatus is floating and pushed upwards in order to be diffused by means of a rotating diffusion head in the shape of a paddle-wheel. This feature increases efficiency of the installation, allowing the velocity of the fluid leaving the propeller to be kept as low as possible and the dimensions of intake volute and propeller to be increased.

3 Claims, 5 Drawing Figures

APPARATUS FOR MIXING AIR AND LIQUID

CROSS-REFERENCE TO RELATED APPLICATION

This application is a continuation of Ser. No. 278,232 filed June 29, 1981 and now abandoned.

TECHNICAL FIELD

The present invention relates to an apparatus for mixing a gas such as air with liquid and, vice versa, for removing a gas from a liquid. More particularly, the invention relates to application of such an apparatus as a surface aerator in a water-purification plant to provide the required oxygen transfer for biological purification of waster water.

BACKGROUND ART

A surface aerator generally comprises a power drive fitted on a float or a rigid structure of a purification plant. The motor drives a shaft provided with impeller means such as a paddle wheel or a propeller generally combined with a static diffusion or deflection head. There are several kinds of aerators among which one can make a distinction between low speed aerators ($\pm 60$ rev/min) and high speed aerators (700–1800 rev/min).

A low speed aerator mainly comprises an impeller shaped as a conical paddle wheel having a large diameter, a part of which extends below the surface level of the water and which is driven by an electric motor through a speed-reducing gear. The efficiency of such aerators is very good in clean water.

High speed aerators are provided with a propeller shaft directly connected to the motor. The water is forced upwardly at high speed by the screw-propeller and is diffused horizontally by a static deflector or by a trailing edge. According to their application, these aerators have more or less good efficiency in water loaded with low amounts of sludge.

DISCLOSURE OF THE INVENTION

The purpose of the present invention is to improve the efficiency of directly driven high speed aerators and to provide the possibility to adjust said high level of efficiency to the different kinds of applications according to the loading degree of the waste water.

There is provided by the present invention an apparatus in which the impeller means fitted on the motor shaft comprise a lower part shaped as a screw-propeller pump which sucks the liquid in an axially upward stream and an upper part shaped as a centrifugal paddle-wheel or impeller with blades which gradually impart a horizontal component of movement to the stream of liquid. In a preferred form of the invention, the lower and upper parts of the impeller are joined together to form one single body.

The blades of the centrifugal impeller are hydrodynamically shaped so as to collect the streams of liquid flowing axially upward from the screw propeller and to gradually bend these streams into a radial direction to obtain a horizontal component of the path of movement. The centrifugal impeller blades could be connected, or not, to a diffusion head or deflector.

Still another characteristic of the invention is that the size of each independent impeller portion can be chosen to correspond to an optimum efficiency for each intended application, as follows:

(a) with very low and low-loaded activated sludge system: increasing the size of the screw propeller pump and reducing the size of the centrifugal impeller (b) with medium-loaded activated sludge systems: adopting almost equivalent sizes for the two impeller parts; and (c) with highly-loaded activated sludge systems: increasing the size of the centrifugal impeller and reducing the size of the screw propeller.

BRIEF DESCRIPTION OF THE DRAWINGS

Other particular features and advantages of the invention will be described with more details in the following description referring to the accompanying drawings in which.

BEST MODE FOR CARRYING OUT THE INVENTION

Figure 1:
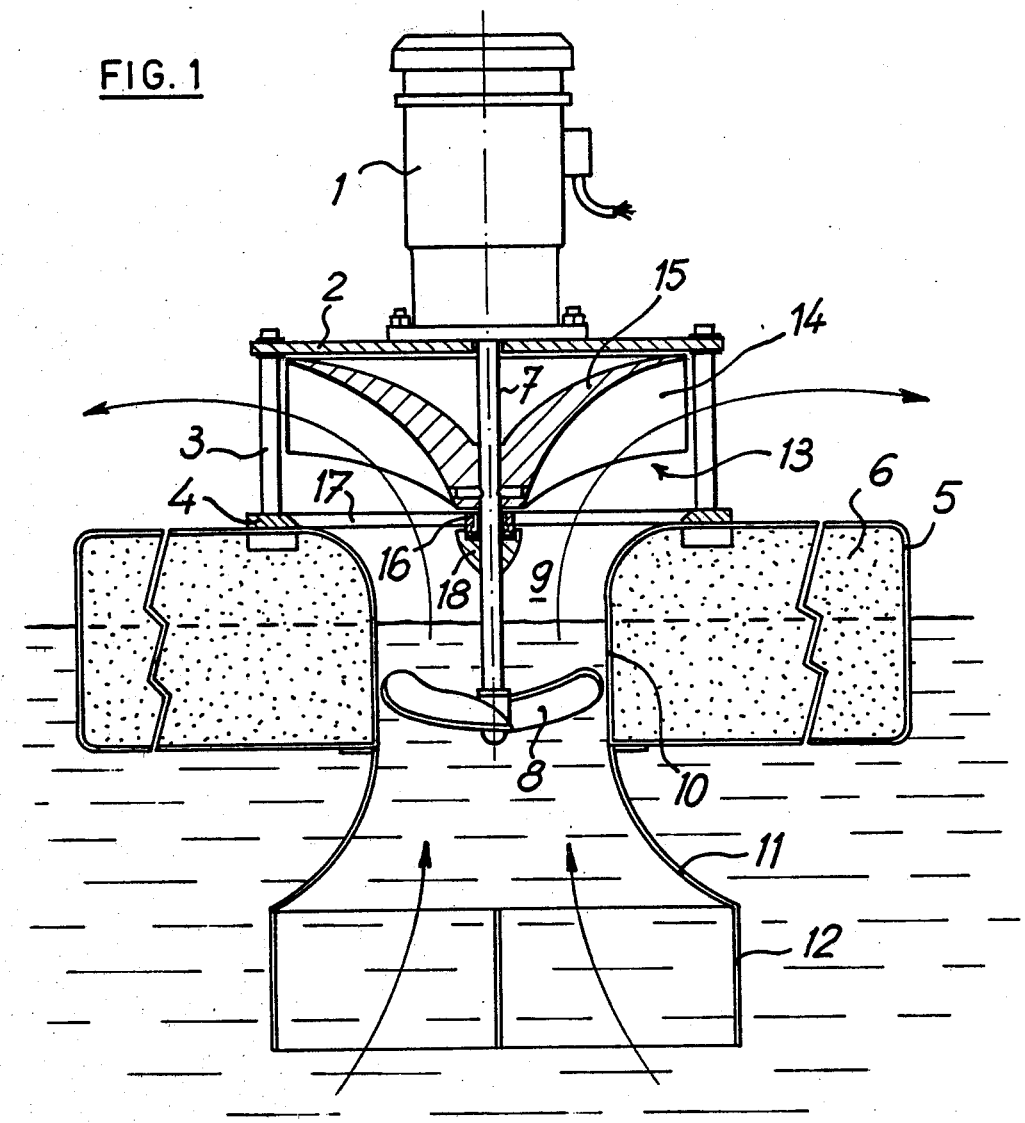
FIG. 1 is a sectional schematic view showing an apparatus according to the invention.

FIG. 1 shows an apparatus provided with an electric motor 1 or other power drive mounted on a bearing plate 2 carried by distances-pieces 3 on a mounting ring 4. Ring 4, in its turn, is fixed on the upper portion of a float 5. The float 5 conventionally comprises a shell 6 of metal or fiberglass polyester filled with polyurethane foam.

At the lower end of the motor shaft 7, there is fixed a screw propeller 8 which extends up to a level below the surface level of the water through an opening 9 provided in the float 5 or between the floats if several floats are provided.

Around the screw propeller 8, there is arranged a cylindrical intake volute section or housing 10 which is provided at its lower end with an intake cone 11. Optionally, intake cone 11 may include a transverse stabilizer 12 having a cruciform or any other suitable shape. The upper edge of the cylindrical intake volute section 10 preferably is flared outwardly to improve the hydraulical passageway.

According to the invention, the shaft 7 is also provided with a centrifugal or aerator impeller 13 essentially including hydrodynamical blades 14 and an deflection or diffusion head 15. As illustrated, blades 14 extend radially beyond the tips of the blades of screw propeller 8. As a result of this configuration, the exit velocity of liquid leaving blades 14 actually will exceed the axial velocity of the liquid flowing upward through volute section 10; so that, the kinetic energy of the liquid actually increases as it is moved up and out.

For supporting the relatively long motor shaft 7 provided in this embodiment, there may be provided a bearing located in an anti-deflection ring 16 connected through arms 17 with the stationary mounting ring 4. For reducing the resistance encountered by the water when propelled upwardly against the anti-deflection ring 16, there is provided on the lower side of the ring 16 a hydraulic deflector 18. Driving of the movable part or parts by the motor can be effected by means of a single piece shaft or by coupling means.

In operation of the apparatus, the propeller 8 acts as an axial pump which propels the liquid upwardly with a speed velocity $V_1$. This speed need not be as important as with known high speed surface aerators but has to be sufficiently high to bring the liquid to the level of the centrifugal impeller 13. Centrifugal impeller has at its periphery a well determined peripheral speed $V_2$. The blades 14 must be made such that they take charge of the vertically rising liquid or fluid streams and bend the latter gradually to a spiral so as to obtain a horizontal component of movement at the outlet. In theory the value of the outlet speed $V_R$ has to correspond with the resultant speed of the vertical stream $V_1$ and peripheral speed $V_2$ of the impeller 13; that is $$V_R = V_1 + V_2$$

Figure 2A:
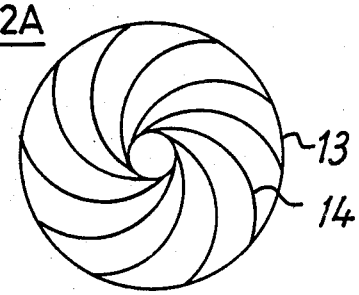
FIGS. 2A and 2B represent embodiments of the centrifugal impeller.
Figure 2B:
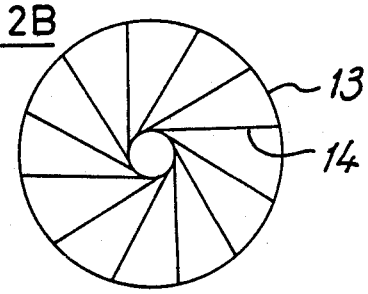

According to the possible embodiments, the blades 14 should have more shapes as shown in FIG. 2A, in which the hydrodynamical streams should approach as much as possible the equation shown hereabove and it would be possible to adopt straight blades disposed tangentially as shown in FIG. 2B, with which a lower yield is obtained while simplifying the construction.

Both component parts of the impeller may be dimensioned separately in order to accentuate either the mixer (pump) function or the aerator (centrifugal) function. Thanks to this possibility, the aerator may well be adapted to the precise application, as follows:

(a) with very low and low-loaded sludges where the stress is put completely onto the function of mixing since the power needed for mixing substantially exceeds the power needed for aeration (b) with medium-loaded activated sludges where the power needed for mixing is practically equal to the power needed for aeration; so that, the available power may be divided into equal parts between the propeller pump and the centrifugal impeller; and (c) with highly-loaded activated sludges where the stress is completely put onto aeration since the power needed for aeration substantially exceeds the power needed for mixing; so that, the dimensions of the centrifugal impeller are more important than those of the propeller pump.

In the extreme case one could contemplate the application of an aerator with only the centrifugal portion.

Figure 3:
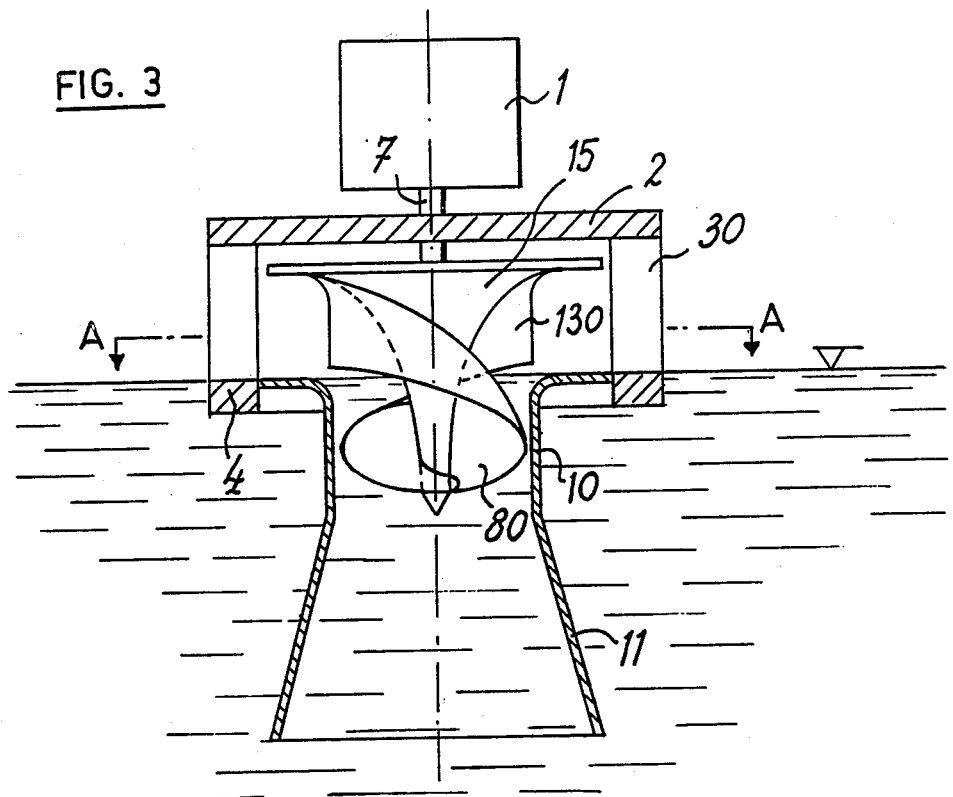
FIG. 3 is a longitudinal section of a modified embodiment.
Figure 3A:
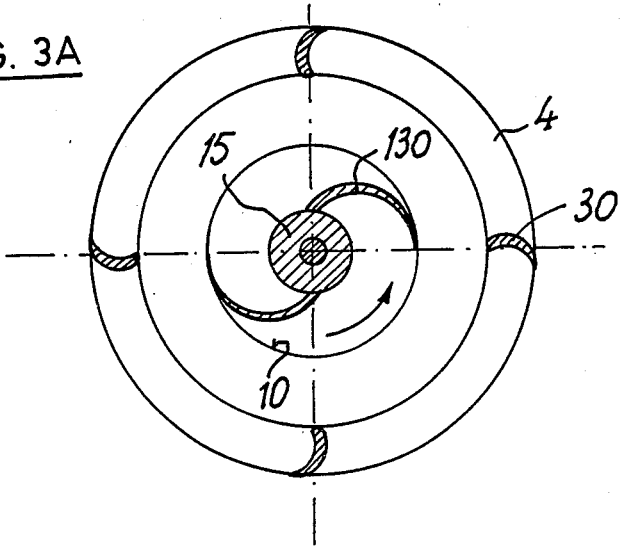
FIG. 3A is a section along line A—A of FIG. 3.

Another embodiment is shown in FIGS. 3 and 3A in which the same elements are referred to with the same reference numerals. The propeller pump 80 and the centrifugal impeller or aerator 130 are combined into one single impeller body. The pump portion 80 extends up to a level below the surface level of the water and sucks water axially upwardly through the cone 11 and the cylindrical intake volute section 10. The propeller pump also may be arranged as a self-priming pump and placed completely or partly above the surface level of the water. The blades of propeller pump 80 gradually curve into a spiral, as shown in FIG. 3, to merge into and form blades of the centrifugal impeller 130.

The aerator portion or centrifugal impeller 130 is located above the propeller pump portion and tends to bend gradually the axially streaming water towards a radial direction by dispersing the water onto the surface level of the water by centrifugal force. The aerator portion also may optionally be located completely or partly under the surface level of the water or completely above the water surface level. According to an important feature of this embodiment, water is continuously guided from vertical suction up to substantially horizontal dispersion. As illustrated, and as in the embodiment of FIG. 1, the exit diameter of the centrifugal impeller portion 130 is greater than that of pump portion 80, so that the velocity and kinetic energy of the liquid are increased as it is moved up and out.

It is also possible to provide that the water shall only be bent partly in the centrifugal impeller and diffused towards the horizontal path of movement by means of a stator or fixed deflector.

In such an embodiment, the distance-pieces 30 connecting the bearing 2 with the mounting ring 4 preferably are shaped as inverting blades to partly collect the water which goes out at a well-determined angle so as to form a reaction against the component movement created by the centrifugal outlet force of the water. By this arrangement one avoids that the float or its mounting structure are subjected to a continuous stress.

The apparatus according to the invention accordingly performs two functions by a single direct drive; that is, pumping or mixing the fluid in the purification station by applying the principle of an axial propeller pump which is perfectly adapted to a very high flow rate and small elevation height, through care should be taken to keep the lowermost possible velocity of the water to obtain high efficiency; and aerating or dispersing with feeding of oxygen by applying the principle of a centrifugal turbine with a gradually opening conical wheel or impeller provided with blades to bend the streams of water from vertical to horizontal direction, thereby obtaining a fluid outlet speed which is equivalent to that of conventional aerators turning at high speeds, but with a higher efficiency.

The apparatus described hereabove only are examples of embodiments; other embodiments are possible without however departing from the scope of this invention.

What I claim is:

1. An improved aparatus for aeration of a body of liquid such as a body of waste water, said apparatus comprising:

a top-mounted power drive having a rotatable shaft extending downwardly toward the surface of said body of liquid; and an impeller mounted on said shaft for rotation therewith at the surface level of said body of liquid, said impeller comprising an upwardly, outwardly flared diffusion head forming an impeller body having a lower, axial flow inducing, propeller shaped portion with a blade having a first outer diameter, said blade being mounted on the lower end of said diffusion head for drawing liquid from said body of liquid and pumping said liquid axially upward at a first velocity; said impeller body also having an upper, centrifugal flow inducing portion with a plurality of radially outwardly curved blades having second, outer diameters larger than said first diameter, said blades being mounted on said diffusion head for receiving therebetween said liquid pumped axially upward by said axial flow inducing portion and for centrifugally expelling said liquid outwardly from said impeller at a second velocity greater than said first velocity at a position above the surface of said body of liquid, said blade of said propeller shaped portion being gradually curved into a spiral to merge into and form one of said second plurality of blades, said centrifugal flow inducing portion having an exit diameter which is greater than that of said propeller shaped portion, whereby said liquid pumped axially upward by said axial flow inducing portion into said centrifugal flow inducing portion is continuously guided and accelerated by said blades as the direction of flow of said liquid changes gradually from axial to centrifugal before being discharged in a nearly horizontal direction from said centrifugal flow inducing portion.

2. An apparatus as in claim 1, wherein said upper, centrifugal flow inducing portion is shaped in such a way that liquid which is pumped upwardly by said lower, axial flow inducing portion is fed vertically into said upper portion and bent gradually into said spiral thus providing substantially horizontal movement at the outlet of said upper portion where said second velocity is a resultant of the peripheral speed of said upper portion and said first velocity.

3. An apparatus as in claim 1, further comprising a supporting means for said power drive, an intake section disposed around said lower portion, mounting means for said intake section, and distance-pieces connecting said power drive supporting means with said mounting means, said distance pieces being shaped as inverting blade means for collecting a portion of the outlet liquid stream to cause said portion to change its direction to produce a reaction force against the force caused by centrifugal outlet of the liquid stream.

* * * * *